(12) United States Patent
Sugioka

(10) Patent No.: US 7,274,281 B2
(45) Date of Patent: Sep. 25, 2007

(54) DISCHARGE LAMP LIGHTING APPARATUS

(75) Inventor: Shinji Sugioka, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/602,984

(22) Filed: Nov. 22, 2006

(65) Prior Publication Data

US 2007/0115088 A1 May 24, 2007

(30) Foreign Application Priority Data

Nov. 24, 2005  (JP)  ............................. 2005-338459

(51) Int. Cl.
*H01F 27/28* (2006.01)

(52) U.S. Cl. ...................... 336/170; 315/276

(58) Field of Classification Search ................. 336/65, 336/83, 170, 180–184; 315/57, 206, 276
See application file for complete search history.

(56) References Cited

U.S. PATENT DOCUMENTS

| | | | |
|---|---|---|---|
| 4,983,881 A | 1/1991 | Eliasson et al. | |
| 6,239,559 B1 | 5/2001 | Okamoto et al. | |
| 6,356,033 B1 | 3/2002 | Okamoto et al. | |
| 6,369,519 B1 * | 4/2002 | Okamoto et al. | ........... 315/224 |
| 6,568,774 B2 * | 5/2003 | Hitzschke et al. | .......... 315/246 |
| 7,071,632 B2 * | 7/2006 | Ohsawa | ....................... 315/276 |

FOREIGN PATENT DOCUMENTS

| | | |
|---|---|---|
| JP | S53-071733 U | 6/1978 |
| JP | H02-007353 A | 1/1990 |
| JP | S54-063114 U | 5/1999 |
| JP | H11-204280 A | 7/1999 |
| JP | H11-260581 A | 9/1999 |
| JP | 2005-039092 A | 2/2005 |

* cited by examiner

*Primary Examiner*—Tuyen T. Nguyen
(74) *Attorney, Agent, or Firm*—Rader, Fishman & Grauer PLLC

(57) ABSTRACT

A discharge lamp lighting apparatus for supplying high frequency high voltage to an excimer discharge lamp comprises a boasting transformer having a core, a secondary side coil and a pair of primary side coils; a DC power source; and switching elements, wherein a duty ratio of an electrically conductive period to an operational cycle of each of the switching elements is 30% or less, a turn ratio of the secondary side coil to each of the primary side coils is 25 or less, a difference between a first length of a first axial direction area where each of the primary side coils are wound, and a second length of a second axial direction area where the secondary side coil is wound, is 18% or less of the first length or the second length, and a leakage inductance associated with magnetic coupling between the primary side coils and the secondary coil is 0.2% to 0.7% of a primary side coil inductance.

14 Claims, 7 Drawing Sheets

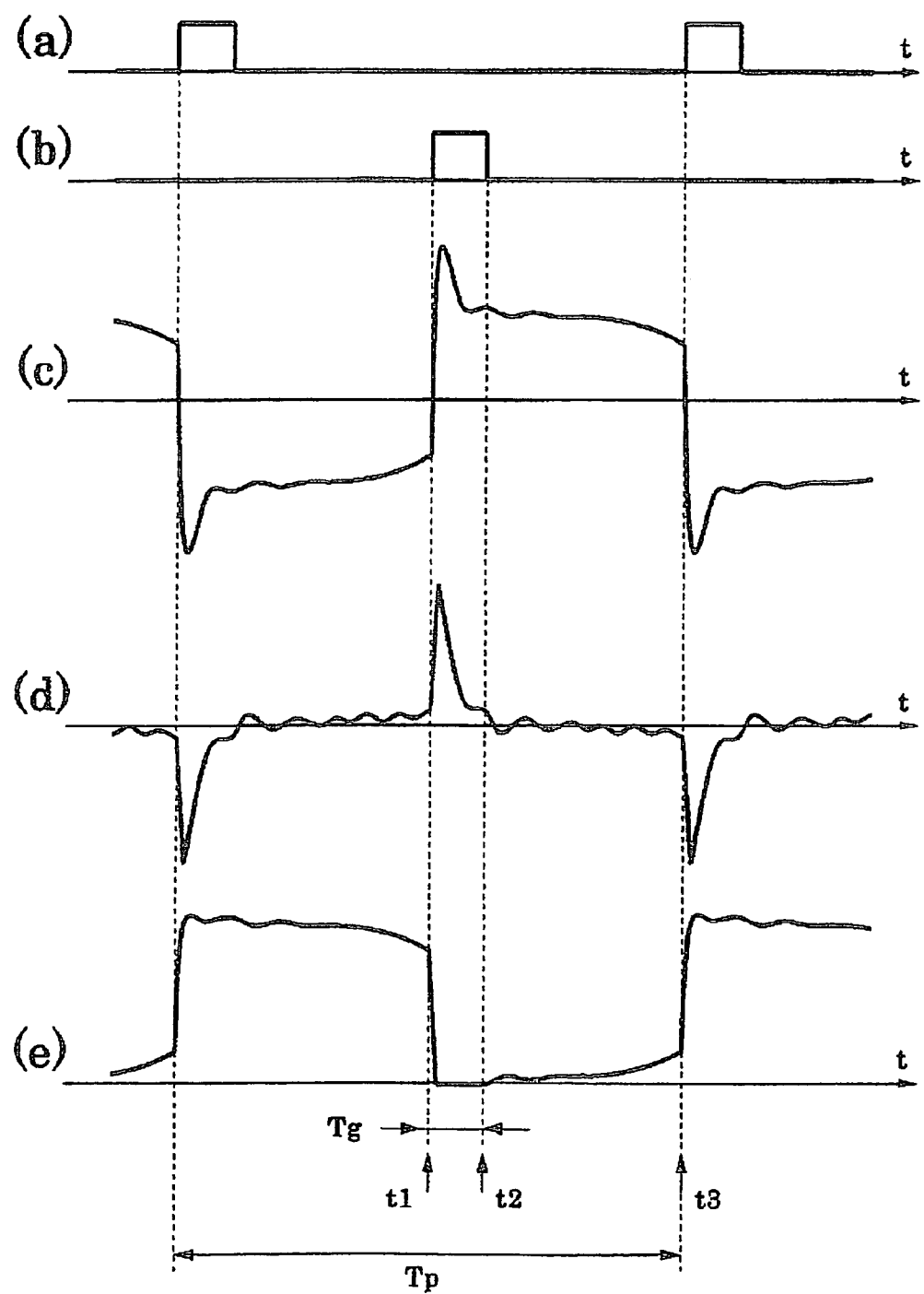

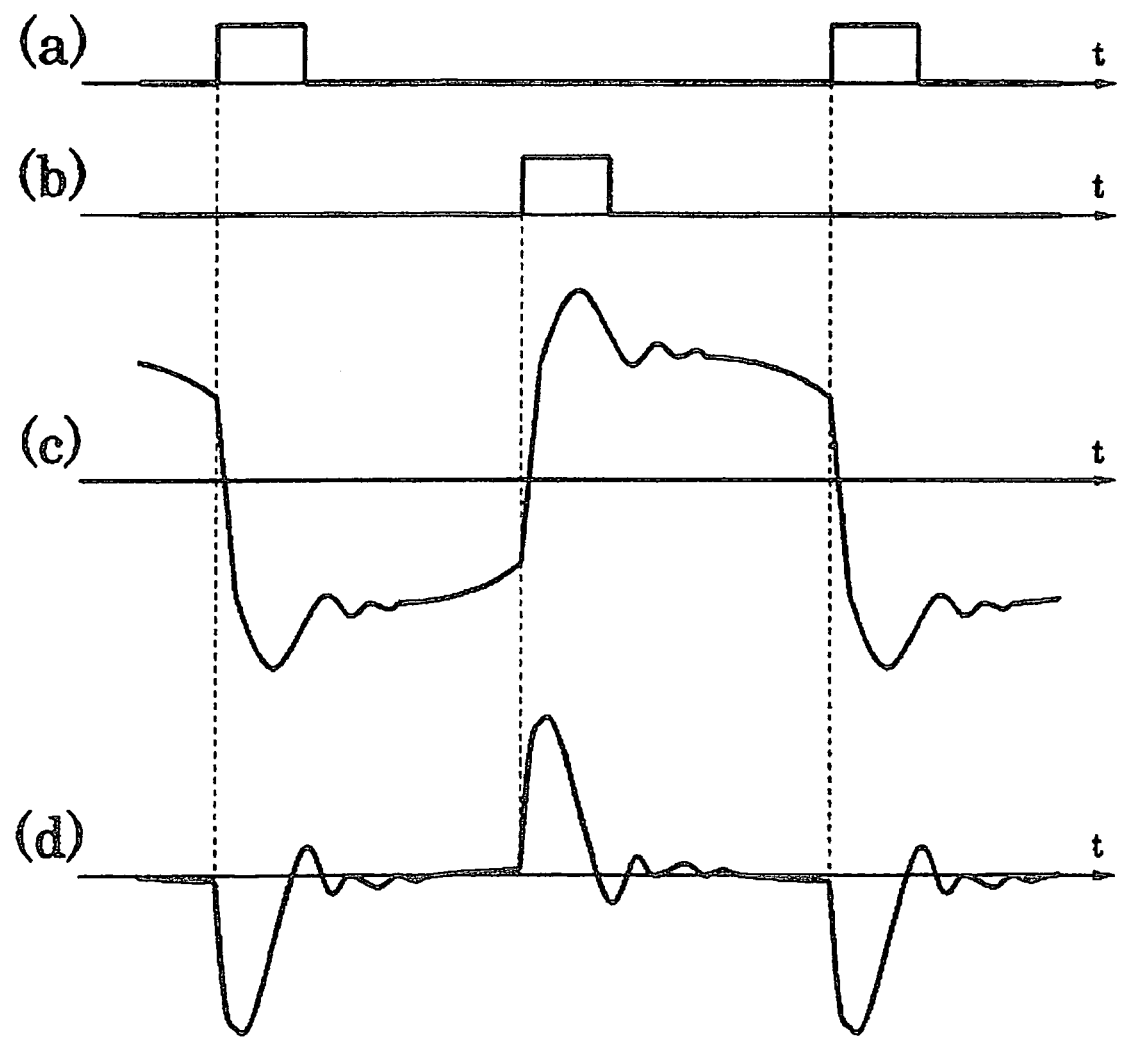

DISCHARGE LAMP LIGHTING APPARATUS

CROSS-REFERENCES TO RELATED APPLICATION

This application claims priority from Japanese Patent Application Serial No. 2005-338459 filed on Nov. 24, 2005, the contents of which are incorporated herein by reference in its entirety.

TECHNICAL FIELD

Described herein is a discharge lamp lighting apparatus for a light source apparatus having an excimer discharge lamp used as an ultraviolet-rays light source for photochemical reaction, in which an excimer molecules are formed by electric discharge in the presence of dielectric material in an electric discharge plasma space where electric discharge gas containing rare gas, such as an argon, a krypton, and a xenon is filled up, so that light emitted from the excimer molecules are used.

BACKGROUND

In recent years, washing processing by which organic contaminant adhering to a surface to be irradiated by light is removed, or oxide-film formation processing by which an ultra-thin oxide film is formed on a surface to be processed, by irradiating vacuum ultraviolet radiation having a wavelength of, for example, 200 nm or less, to various work pieces to be processed.

An excimer discharge lamp in which excimer molecules, such as xenon molecules, are generated by using dielectric barrier electric discharge thereby emitting excimer light is widely used as an irradiation source of the vacuum ultraviolet radiation.

The background art of such an excimer discharge lamp is disclosed in, for example, Japanese Laid Open Patent No. H02-007353. Specifically, a radiator in which an electric discharge container is filled up with electric discharge gas, and excimer molecules are formed by the presence of dielectric material whereby light emitted from the excimer molecules is taken out, is disclosed therein. The electric discharge intervened by the dielectric material is also called ozonizer electric discharge or silent electric discharge. Refer to "Electric Discharge Handbook, revised new edition" $7^{th}$ edition, page 263, resold Jun., 1989, published by Institute of Electrical Engineers of Japan.

A dielectric barrier discharge lamp light source apparatus is disclosed in Japanese Laid Open Patent No. H11-204280, may be related art to the present invention. According to the Japanese Laid Open Patent, in order to obtain efficient excimer light emission, a leading edge of a waveform of an AC voltage impressed to the lamp needs to be steep. A flyback, a half bridge, or a full bridge type inverter can be used for a circuit in order to realize it.

Moreover, Japanese Laid Open Patent No. H11-260581 discloses that it is possible to ease conditions of the steepness of a leading edge of an AC voltage waveform which is needed for the AC voltage impressed to a lamp, and also it is possible to reduce the peak current of a switching element of an inverter, and further a half bridge, a full bridge, and a push pull type inverter can be used to realize a circuit therefore. Furthermore, it discloses that in order to realize a steep lamp voltage waveform, leakage inductance between primary and secondary coils of a boosting transformer of an inverter must be small.

Moreover, a high-frequency high-voltage transformer is disclosed in many references, such as Laid Open Utility Model Patent Nos. 53-071733, and 54-063114. Further, in these references, as a suitable flyback transformer, the technology of a double bobbin in which primary and secondary side coils are wound around separate bobbins and are assembled so that the bobbin for the secondary side coil may contain the bobbin for the primary side coil, and the technology using the bobbin for a section winding, are disclosed.

Furthermore, a boosting transformer of a discharge lamp lighting apparatus for an excimer discharge lamp is disclosed in, for example, Japanese Laid Open Patent No. 2005-039092. According to the reference, a gap layer between primary and secondary side coils is provided and further the gas layer between the primary and secondary side coils can be narrowed, while avoiding an undesirable phenomenon such as corona discharge in the transformer, and further, the energy transmission efficiency from the primary side coil to the secondary side coil can be improved, so that it is possible to realize steep voltage waveform applied to the lamp. Furthermore, it discloses that in order to realize a steep voltage waveform applied to a lamp, floating electrostatic capacity in the secondary side coil should be made small.

As disclosed in the references as to the conventional technology, efforts to make small the leakage inductance between the primary and secondary side coils of the boosting transformer of an inverter have been made, aiming at realization of efficient excimer light emission, as the highest priority objective. Moreover, although it is recognized that loss in the transformer can be reduced by making the floating electrostatic capacity in the transformer small, only measure has been taken to the extent that the leakage inductance between the primary and secondary side coils is not increased. Therefore, since technical development had been performed while reduction of the efficiency of a discharge lamp lighting apparatus is rather permitted, optimization in view of the total efficiency of a combination of the discharge lamp lighting apparatus and the excimer discharge lamp has not been considered.

SUMMARY

A discharge lamp lighting apparatus capable of realizing loss reduction of a switching element of an inverter or a boosting transformer is provided at a low cost, a while maintaining a required steep leading edge of a waveform of an AC voltage applied to a lamp in order to carry out high efficient excimer light emission in an excimer discharge lamp.

The present discharge lamp lighting apparatus for supplying high frequency-high voltage to an excimer discharge lamp comprises a boasting transformer having a core, a secondary side coil and a pair of primary side coils; a DC power source; and switching elements, wherein one end of each of the primary side coils is connected to one of output modes of the DC power source, the other end of each of the primary side coils is connected to one end of each of the switching elements, the other end of each of the switching elements is connected to the other output node of the DC power source, the switching elements are controlled so as to alternately become an electrically conductive states, thereby serving as a push-pull inverter, the excimer discharge is connected to ends of the secondary side coil, a duty ratio of an electrically conductive period to an operational cycle of each of the switching elements is 30% or less, a turn ratio of the secondary side coil to each of the primary side coils is 25 or less, a difference between a first length of a first axial direction area where each of the primary side coils are wound, and a second length of a second axial direction area where the secondary side coil is wound, is 18% or less of the first length or the second length, a leakage inductance associated with magnetic coupling between the primary side coils and the secondary coil is 0.2% to 0.7% of a primary side coil inductance, and the primary side coils and the secondary side coil are placed apart from each other.

Since the turn ratio of the secondary side coil (200) to the primary side coils (110, 120) is 25 or less and the difference between the length of an area in the axial direction where each of the primary side coils (110, 120) is wound, and the length of an area in the axial direction where the secondary side coil (200) is wound is 18% or less of the length of the primary or second side coil area, the magnetic combination between the primary side coils (110,120) and the secondary side coil (200) becomes firm.

When the switching element of the inverter connected to one of the primary side coils (110, 120) switches from a non-electrical conductive state to an electrical conductive state, in the secondary side coil (200), the fundamental demand of realization of a steep leading edge of a voltage waveform impressed to a lamp is secured, and the efficient excimer light emission is secured.

Since the primary side coils (110, 120) and the secondary side coil (200) are placed apart from each other so that the leakage inductance associated with the magnetic connection between the primary side coils (110, 120) and the secondary side coil (200) is 0.2 to 0.7% of the inductance of the primary side coils (110, 120), the floating electrostatic capacity between the layers of the primary side coils (110, 120) and the secondary side coil (200) may decrease, thereby contributing to realization of a steep leading edge of the AC voltage waveform impressed to the lamp, and at the same time, although the steepness of the waveform leading edge of the AC voltage impressed to the lamp is slightly scarified, when the switching element (311, 321) of the inverter connected to one of the primary side coils (110,120) switches an electrically conductive state to an electrically non-conductive state, loss reduction resulting from an ON resistance of the switching element is achieved since the peak current value of the current flowing through the switching element is controlled to be low.

Therefore, deterioration of the efficient excimer light emission caused by the slight sacrifice of steepness of the leading edge is limited to an acceptable range in comparison with the effect of loss reduction attributing to the ON resistance of the switching element.

Furthermore, since the duty ratio of an electrically conductive state period to each operation cycle in the switching elements (311, 321) is set to 30% or less, excessive current flowing through the switching element (311, 321) is suppressed thereby contributing to reduction of heat generation of the switching elements, so that it is advantageous when realizing it at low cost.

Moreover, since one of terminals of the each switching element (311, 321) is commonly connected to the same output node of the DC power source (330), an insulating unit, a high side driver, etc. for gate-driving of a switching element required in the case of a full bridge type or a half bridge type is not required become unnecessary, it is advantageous in terms of reduction of cost.

In the discharge lamp lighting apparatus, the primary side coils may be wound by a bifilar winding method, so as to form one layer.

Since both of the primary side coils (110, 120) are wound to form one layer by a bifilar winding method, the leakage inductance between the primary side coils is limited to be very small, when the switching element of the inverter connected to one of the primary side coils (110, 120) switches from an electrical conductive state to an electrically non-conductive state, for example, in a non-load period in which the excimer discharge lamp (3) is not connected, surge voltage impressed to the switching element in which the electrical conductive state is changed to the electrically non-conductive state is suppressed on the condition in which reset current flows through the other coil in order to extinguish the magnetic flux in the core (2), so that a measure required for preventing voltage destruction of the switching element connected thereto is eased, so that it is advantageous in terms of reduction of cost.

In the discharge lamp lighting apparatus, each of the primary side coils may be wound to form one layer so as to form two layers in total.

The primary side coils (110, 120) are wound so as to form one layer respectively thereby forming two layers.

Therefore, in such a case, even where in the bifilar winding, the primary side coils cannot be used since voltage between adjacent coils in the primary side coils (110,120) becomes high so that the voltage may exceed the voltage limit of insulation coating of the coils, a pair of the primary side coils (110, 120) can be wound.

Moreover, since the leakage inductance between the primary side coils is also suppressed to a relatively small value, it is possible to control the impression of surge voltage to the switching element.

The discharge lamp lighting apparatus according to claim 1, wherein the secondary side coil is wound by a turn back winding method so as to form tow or more layers.

Since the secondary side coil (200) forms two or more layers wound by the turn back method, the above mentioned effects can be acquired. Further, the distance between the layers of the second side coil (200) increases, so as to serve as a means for setting the leakage inductance between the primary side coils (110, 120) and the secondary side coil (200) to a specific value range. In addition, since the floating electrostatic capacity between the layers of the secondary side coil (200) decreases, circulating current in the secondary side coil (200) at the time of lamp lighting can decrease, so that loss of the secondary side coil (200) can be reduced.

The discharge lamp lighting apparatus according to claim 1, wherein the primary side coils are wound around a primary side coil bobbin, the secondary side coil is wound around a secondary side coil bobbin by a section winding method, and one of the primary side coil bobbin and the secondary side coil bobbin is placed inside the other.

Since the secondary side coil (200) is wound around the bobbin for the secondary side coil (60) by the section winding method, the above-mentioned effects can be acquired. Further, the distance between winding sections of the second side coil (200) increases, and the secondary side coil (200) can serve as a means for setting the leakage inductance between the primary side coils (110, 120) and the secondary side coil (200) to a specific value range.

In addition, since the floating electrostatic capacity between the winding sections of the secondary side coil (200) decreases, circulating current in the secondary side coil (200) at the time of lamp lighting can decrease, and loss of the secondary side coil (200) can be reduced.

Moreover, since the primary side coils (110, 120) are wound around the bobbin (50) for the primary side coil, and the bobbin (50) for primary side coils and the bobbin (60) for the primary side coils are formed so that one of them is provided in the other, it is possible to serve as a means for setting the leakage inductance between the primary side coils (110, 120) and the secondary side coil (200) to the specific numerical range. Moreover, insulation between the primary side coils (110, 120) and the secondary side coil (200) is enhanced, and in addition, it is not necessary to use insulating paper, such as NOMEX (Trademark of DUPONT) or insulating tapes so that it is advantageous in terms of reduction of cost.

As mentioned above, it is possible to reduce loss in the switching element of an inverter, or loss in a boosting transformer at low cost, while maintaining the required steepness of the leading edge of AC voltage waveform impressed to an excimer discharge lamp in order to carry out efficient excimer light emission.

BRIEF DESCRIPTION OF DRAWINGS

Other features and advantages of the present discharge lamp lighting apparatus will be apparent from the ensuing description, taken in conjunction with the accompanying drawings, in which:

FIG. 3 is shows a waveform of each part of a push pull inverter of a discharge lamp lighting apparatus;

FIG. 8 is a reference diagram showing a waveform of each part of a general push-pull inverter.

DETAILED DESCRIPTION

While the claims are not limited to the illustrated embodiments, an appreciation of various aspects of the present discharge lamp lighting apparatus is best gained through a discussion of various examples thereof.

Figure 1:
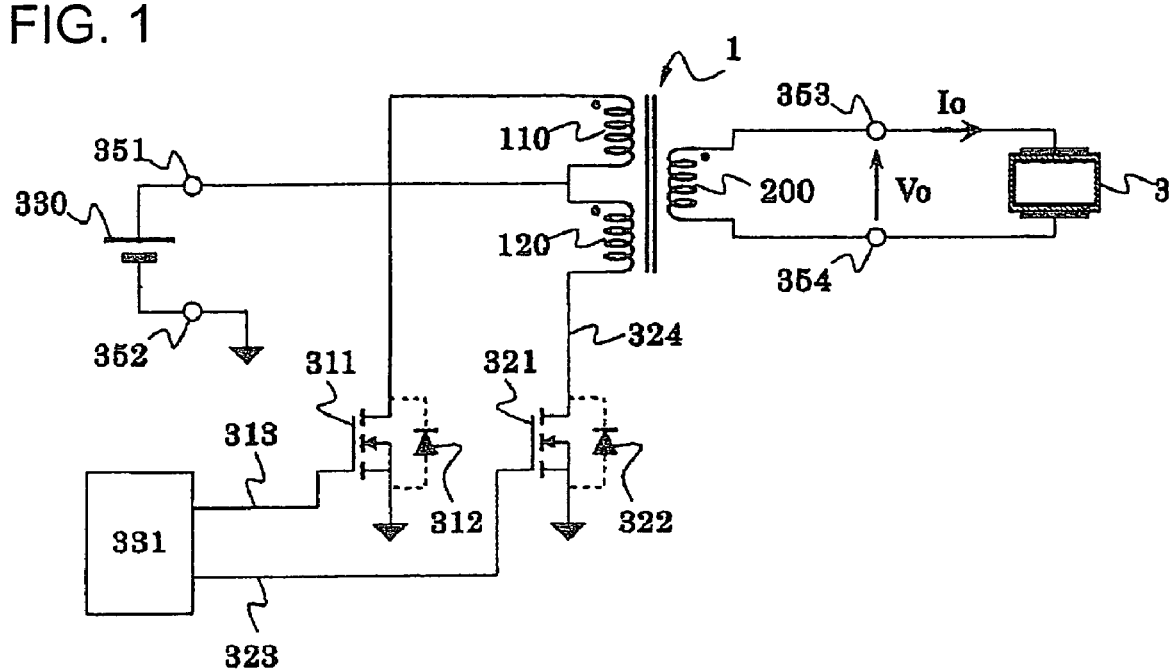
FIG. 1 is a circuit diagram showing the structure of a push-pull inverter of a discharge lamp lighting apparatus.

FIG. 1 is a circuit diagram of a discharge lamp lighting apparatus for turning on an excimer discharge lamp according to the embodiment.

In this figure, the excimer discharge lamp (3) is connected to a secondary side coil (200) of a boosting transformer (1) through a terminal (353, 354). This boosting transformer (1) is used as part of a push pull inverter as shown in FIG. 1, and must be suitably used to efficiently turn on an excimer discharge lamp (3).

One end of the primary side coils (110) of the boosting transformer (1) is connected to an output node (351) on a plus side of a DC power source (330) and the other end of the primary side coils (110) is connected to an end of the switching element (311) which is a MOSFET etc. The other end of the switching element (311) is connected to an output node (352) of the DC power source (330) on its ground side. Similarly, an end of the primary side coil (120) of the boosting transformer (1) is connected to an output node (351) of the DC power source (330) on its plus side. The other end of the primary side coil (120) is connected to an end of a switching element (321) which is MOSFET etc. The other end of the switching element (321) is connected to the output node (352) of the DC power source (330) on its ground side.

However, the polarity of the primary side coils (110, 120) is chosen so that the direction of the magnetic flux in a core of the boosting transformer (1) at time when the switching element (311) is electrically conductive, can be opposite to that at time when the switching element (321) is not electrically conductive.

Gate driving signals (313, 323) for alternately making the switching element (311, 321) into an electrically conductive state at a high frequency is sent to a gate terminal of each switching element (311, 321) from a gate driving circuit (331).

In general, a dead time, that is, a period during which both of the switching elements (311, 321) are held in an electrically non-conductive state after one of the switching elements (311, 321) transits from an electrically conductive state to an electrically non-conductive state before the other one transits from an electrically non-conductive state to an electrically conductive state, is provided in the gate driving signals. In the present embodiment, the dead time is set to be so long that duty ratio of an electrically conductive state period to an operational cycle of the switching elements (311, 321) may be 30% or less.

Figure 2:
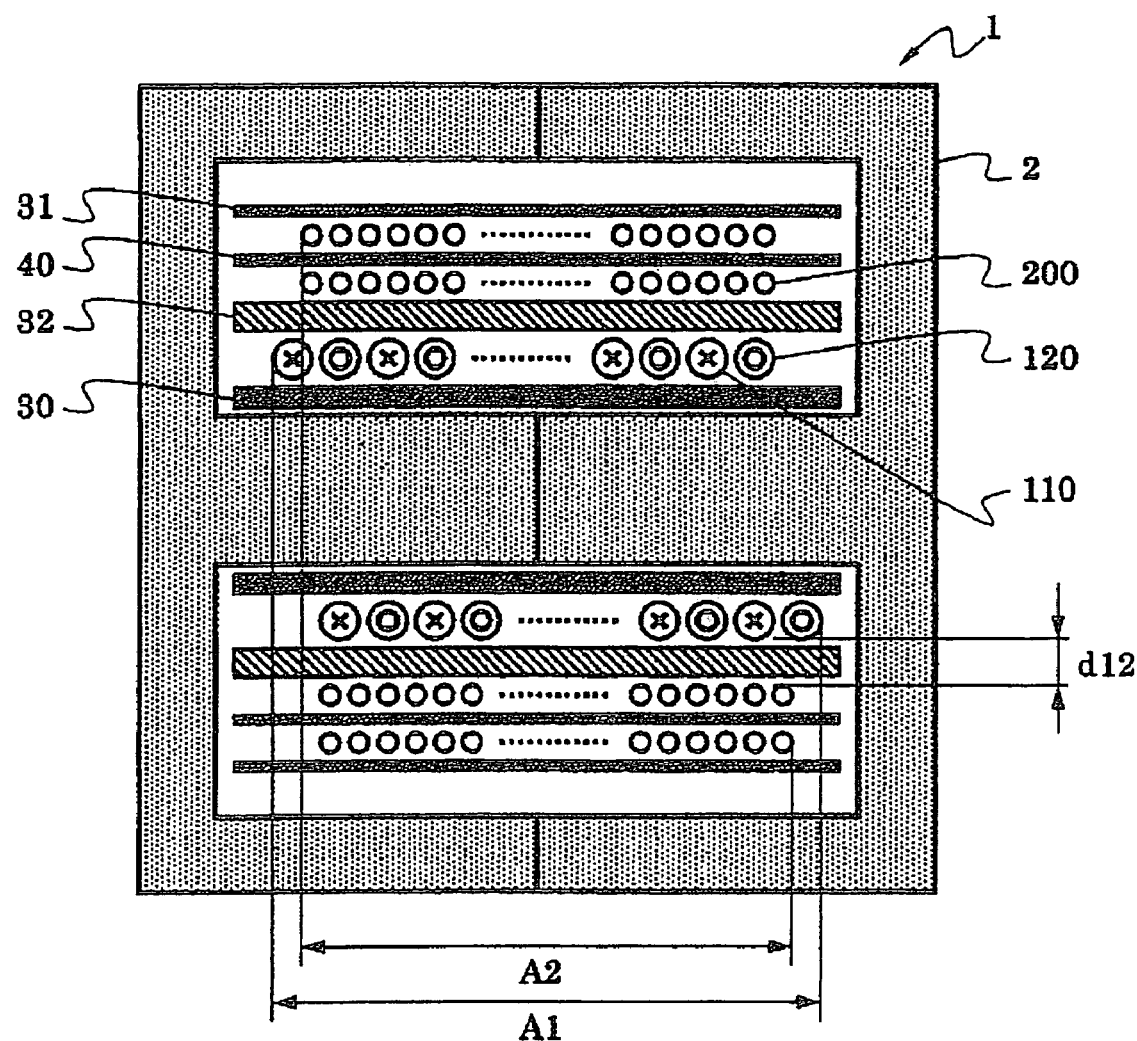
FIG. 2 is a schematic cross-sectional view showing an example of the structure of a boosting transformer of a discharge lamp lighting apparatus.

FIG. 2 is a cross-sectional view showing a boosting transformer used for the discharge lamp lighting apparatus according to the embodiment, in order to turn on the excimer discharge lamp.

The boosting transformer (1) mainly comprises a core (2), a secondary side coil (200), and a pair of primary side coils (110, 120). Although in the figure, the core (2) is formed by combining two E-shaped cores (EE type), other forms thereof (for example, EI type etc.) may be used.

Moreover, although the core (2), especially a coil winding portion whose shape is a circle in a cross-sectional view is commonly used, other cores having a cross-sectional view of, for example, an ellipse, a rectangle, etc. may be used.

In the figure, the primary side coils (110, 120) are wound on a winding core (30), and insulating paper, such as NOMEX (Trademark of DuPont) may be wound around the winding core (30), or a bobbin made of resin may be used therefor.

In this figure, the primary side coils (110, 120) which are wound by a bifilar winding method are shown.

Figure 4A:
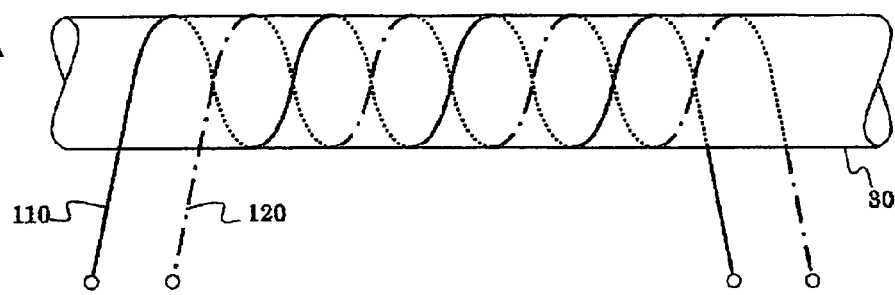
FIG. 4 is a diagram of a winding method applicable to a boosting transformer of a discharge lamp lighting apparatus.

In this embodiment, the bifilar winding method means a winding method in which two or more coils are always wound in parallel, as shown in FIG. 4A, so it is not a winding method in which coils are wound around a core by dividing the core to a right and left halves or coils are wound by separate layers.

In FIG. 2, a symbol "X" is assigned to the primary side coils (110), and a symbol "O" is assigned to the primary side coil (120).

Figure 4B:
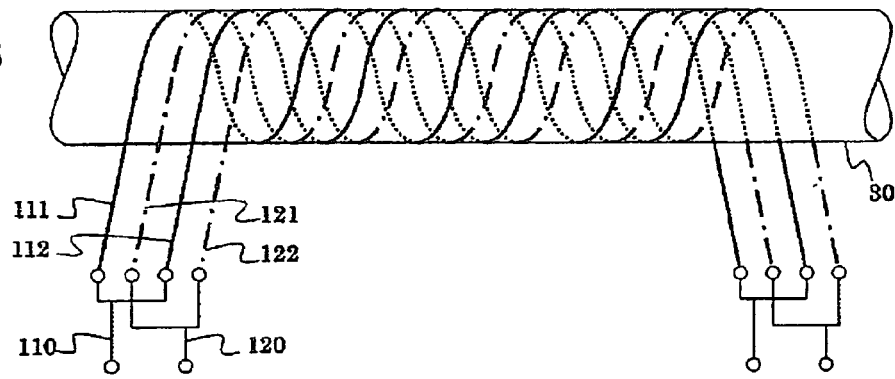

In addition, although, depending on a value of current passing therethrough, there is a case where each of the primary side coils (110, 120) needs to be formed by two or more coils with a parallel connection, it is desirable in such a case to alternately arrange and wind the coils (111, 112) of the primary side coil (110) and the other coils (121, 122) of the primary side coil (120) as shown in FIG. 4B.

While the lengths of areas in the axial direction where the respective primary side coils (110, 120) are wound by a bifilar winding method can be the same, the leakage inductance between the primary side coils can be small. However, because of reasons mentioned below, it is advantageous that the leakage inductance between primary side coils is small, so that it is desirable that the inductance of one of the two primary side coils (110, 120) is 0.3% or less thereof.

While one of the primary side coils (110, 120) is short-circuited and the secondary side coil (200) is in an open state, the inductance of the other primary side coil can be measured by using an impedance meter etc., whereby the value of the leakage inductance between primary side coils can be measured.

Moreover, the inductance of one of the primary side coils (110, 120) can be measured by using the impedance meter etc., while the primary side coils (110, 120) and the secondary side coil (200) are in an open state, whereby the value of the inductance of the primary side coils can be measured. Thus, it is possible to check if the ratio is 0.3% or less thereof.

In addition, since there are two primary side coils, although the two measured inductance values are obtained when one of the primary side coil is short-circuited, and the two measured inductance values are also obtained from two coils when no primary side coils are short-circuited, the ratio can be calculated by using an average value of each case. Moreover, it is suitable that the measurement frequency of the impedance meter is set to 1 kHz.

Although a single wire with insulating coating, such as a polyurethane electric wire, a three-layer insulated wire etc. can be used as a wire rod used for the primary side coils (110, 120), a litz wire can be suitably used therefore, when more reduction of high frequency loss such as eddy current loss etc. is necessary.

In addition, when such a litz wire is used and the voltage between adjoining coils is high, it is desirable to use an insulating fiber winding litz wire, such as a silk winding and a TETRON winding (Japanese Common Trademark of Toray Industries, Inc. and Teijin Limited).

In FIG. 2, an insulating layer (32) between the primary side coils and secondary side coil is provided on the primary side coils (110, 120) which are wound by the bifilar winding method, and the secondary side coil (200) in which the turn ratio of the secondary side coil to one of the primary side coils is 25 or less is wound on the insulating layer (32).

Although in the figure, the secondary side coil (200) comprises two layers between which an interlayer insulation layer (40) is provided, it can comprises more layers or a single layer. On the outermost layer of the secondary side coil (200), in order to prevent undesired electric discharge which occurs between the outermost layer and the core (2), a coating layer (31) made of an insulating material is provided.

The thickness of the insulating layer (32) between the primary side coils and the secondary side coil is adjusted at the time of a design so that the leakage inductance between the primary and secondary side coils described above may fall within the value range described above, due to the clearance d12 between the primary side coils (110, 120) and the secondary side coil (200).

As to the inductance of one of the primary side coils (110, 120), while the primary side coils (110, 120) are in an open state, and the secondary side coil (200) is short-circuited, the value of the leakage inductance between the primary side coils and secondary side coil can be measured by an impedance meter etc.

Moreover, as to the inductance of the primary side coils (110, 120), while the primary side coils (110, 120) and the secondary side coil (200) are in an open state, the inductance of one of the primary side coils can be measured by an impedance meter, etc., so that it is possible to check if the ratio is 0.2 to 0.7% thereof.

In addition, since there are two primary side coils, although the two measured inductance values of the primary side coils are obtained when the secondary side coil is not short-circuited, and two measured inductance values are obtained when the secondary side coil is short-circuited, the ratio can be obtained by using an average value thereof. Moreover, it is suitable that the measurement frequency of the impedance meter is set to 1 kHz.

For the insulating layer (32) between the primary side coils and the secondary side coil, insulating paper or an insulating tape may be wound so as to be laid over or a member made of resin and formed by molding may be used, so that, for example, the insulating layer (32) may become the predetermined thickness. Moreover, it may comprise a resin layer and a gas layer as described below. Part of the secondary side coil (200), the entire coil portion including the primary side coils (110, 120) and the secondary side coil (200) or the entire boosting transformer (1) including the entire coil portions and the core (2) may be molded with an insulator such as silicon resin, epoxy resin etc. or may be immersed in an insulating oil.

In addition, although, in FIG. 2, the primary side coils (110, 120) is disposed inside the secondary side coil (200), the primary side coils may be placed outside the secondary side coil (200). Although in FIGS. 2, 5 and 6, the primary side coils (110, 120) and the secondary side coil (200) are shown so as not to come in contact with the primary winding core (30), the insulating layer (32) between the primary and secondary side coils, the interlayer insulation layer (40), on the coating layer (31) in order to help understanding thereof as a matter of convenience, the primary or secondary coils are in fact-come into contact with these layers or core.

In such a structure of the discharge lamp lighting apparatus according to the embodiment, the circuit of FIG. 1 serves as a push-pull inverter, and voltage from the DC power source (330) is alternately impressed to the primary side coils (110, 120), high frequency/high voltage having a rectangle waveform is generated in the secondary side coil (200), so that the excimer discharge lamp (3) can be turned on at high efficiency.

FIG. 3 shows schematic waveforms in relevant parts of the discharge lamp lighting apparatus according to an embodiment.

A waveform (a) of FIG. 3 shows the gate driving signal (313) of the switching element (311), a waveform (b) thereof shows the gate driving signal (323) of the switching element (321), a waveform (c) thereof shows voltage of the secondary side coil, that is, lamp voltage (Vo), a waveform (d) thereof shows lamp current of the secondary side coil (200), that is, lamp current (Io), and a waveform (e) thereof shows voltage of a drain (324) of the switching element (321) for the secondary side coil(200), respectively. Moreover, the leakage inductance between the primary side coils and the secondary side coil was 0.41% thereof at that time.

The gate driving signal (323) became a high-level at time (t1), and returns to a low level at time (t2).

The operating frequency of the inverter is 50 kHz, that is, operation cycle (TP) is 20 microseconds, and the duty ratio of a high-level period (Tg) thereto is about 16%. Therefore, excessive current flowing through the switching elements (311, 321) is suppressed.

When the switching element (321) is in an electrically conductive state because the gate driving signal (323) becomes a high-level at time (t1), the voltage of the DC power source (330) is impressed to the primary side coil (120), so that lamp voltage (Vo) rises steeply, and the pulse lamp current (Io) flows, and then efficient excimer light emission is generated in the electric discharge plasma space of the excimer discharge lamp (3).

Even when the gate driving signal (323) returns to a low level and the switching element (321) is in an electrically non-conductive state at time (t2), since the excimer discharge lamp (3) is a capacitive load in which dielectric material exists between at least one of a pair of electrodes and electric discharge plasma space, at this time, the lamp voltage (Vo) does not largely change at this, point, and the lamp current (Io) is inverted so as to discharge the electric charge charged by the electrostatic capacity of the excimer discharge lamp (3), so that the continuity of the magnetic flux in the core (2) corresponding to the magnetizing current which flows through the primary side coil (120) may be maintained.

When a load having general resistance property or resistance property having a induction component, or a discharge lamp other than the excimer discharge lamp is connected to the secondary side coil, if the switching element (321) is in an electrically non-conductive state, lamp current that flows so that the continuity of the magnetic flux in the core (2), corresponding to the magnetizing current which flows through the primary side coil (120) may be maintained, flows so as to be regenerated to the DC power source (330) through a reverse parallel parasitism diode (312) of the switching element (311). If the leakage inductance between primary side coils is not small enough at this time, large surge voltage will be impressed to the drain (324) of the switching element (321).

On the other hand, when the excimer discharge lamp is a load, since the current which flows so that the continuity of magnetic flux in the core (2) corresponding to the magnetizing current which flows through the primary side coil (120) may be maintained as described above, flows through the secondary side coil (200) by the inversion of the lamp current (Io), even if the leakage inductance between primary side coils is not small enough, large surge voltage is not impressed to the drain (324) of the switching element (321), when the switching element (321) is in an electrically non-conductive state.

It is advantageous that surge voltage is not impressed, which is a unique point of the discharge lamp lighting apparatus for turning on an excimer discharge lamp. However, it is a problem that the common knowledge technology or common sense about an inverter or boosting transformer for driving a load having general resistance property or resistance property having an induction component or a discharge lamp other than an excimer discharge lamp cannot be applied straightly.

However, even if it is an the discharge lamp lighting apparatus for turning on an excimer discharge lamp, when an inverter is operated in a state where the lamp is not connected, current does not flow through the secondary side coil (200). Since large surge voltage is impressed to the drain terminal of the switching element (311, 321) if the leakage inductance between primary side coils is not small enough, it is desirable that the leakage inductance between primary side coils be small. Therefore, the bifilar winding method is suitable as a winding method for the primary side coils (110, 120).

However, when one of the switching elements (311, 321) changes from an electrically conductive state to an electrically non-conductive state, in order for current to flow through the other coil so as to reset the magnetizing current which flows through one of the primary side coils (110, 120), a reverse parallel diodes (312, 322) are required for the switching element. However, in case the switching element (311, 321) is a MOSFET etc., since these reverse parallel diodes (312, 322) exist as a parasitic diode, it is not necessarily mounted.

However, when an element which does not contain such a reverse parallel diode of parasitism such as a bipolar transistor etc., is used as the switching elements (311, 321), the reverse parallel diodes (312, 322) shown with the dashed line in FIG. 1 are required.

In an embodiment of a discharge lamp lighting apparatus, since the turn ratio of the secondary side coil to a primary side coils are set so as to fall within the above-mentioned numerical value, the highly efficient excimer light emission is secured. Since the leakage inductance between the primary side coils and the secondary side coil is set so as to fall within the above-mentioned numerical value, as described above, when the switching elements (311, 321) switch from an electrically non-conductive state to an electrically conductive state, the peak current value of the current which flows through the switching elements is held down low, and loss resulting from an ON resistance of the switching elements (311, 321) can be reduced.

Since the leakage inductance between the primary side coils (110, 120) and the secondary side coil (200) is increased by arranging the primary side coils (110, 120) and the secondary side coil (200) apart from each other, when the switching elements (311, 321) are switched from a non-electrically conductive state to an electrically conductive state, although the width of pulse current flowing through the switching elements (311, 321) increases, since the peak current value is suppressed and the loss due to the ON resistance of the switching elements are proportional to the second power of the current value, so that the loss is reduced.

As a result, it is possible to improve efficiency of such an inverter, while suppressing degradation of the efficiency of excimer light emission to the acceptable range. In addition, it is possible to realize a low cost discharge lamp lighting apparatus in which an insulating unit, a high side driver, etc. for gate-driving of a switching element is not required.

Since the leakage inductance between the primary side coils (110, 120) of the boosting transformer (1) is set to be small, although surge is rarely generated when the switching elements (311, 321) are switched from an electrically conductive state to an electrically non-conductive state, in case where a snubber circuit including a capacitor for safety is provided, it is advantageous to set the capacitance of the snubber circuit to the minimum in order not to cause bad influence to the realization of steepness of a waveform leading edge of AC voltage applied to the lamp. It is desirable to use an element such as a varistor or clamp diode, which does not operate at time other than that of unsteady surge generation for protection.

The turn ratio of the secondary side coil (200) to each of the primary side coils (110, 120) in the boosting transformer (1) is 25 or less. Structurally, the difference between the length of an area in the axial direction where each of the primary side coils (110, 120) is wound, and the length of an area in the axial direction where the secondary side coil (200) is wound is set to 18% or less of the length of the primary or secondary side coil area, that is, in FIG. 2, the difference between the length A1 of the area in the axial direction and the length A2 of the area in the axial direction may be 18% or less of the primary or secondary side coil area, so that in such a structure, magnetic coupling between the primary side coils (110, 120) and the secondary side coil (200) may be enhanced.

On the other hand, the magnetic coupling between the primary side coils (110, 120) and the secondary side coil (200) is decreased by arranging the primary side coils (110, 120) and the secondary side coil (200) apart from each other, which will be described below.

Since the leakage inductance between the primary side coils and the secondary side coil becomes large as the difference between the lengths A1 and A2 in the axial direction is increased, the lengths A1 and A2 in the axial direction may be set to specific values, respectively, at time of a design of the boosting transformer (1), so that the leakage inductance between the primary side coils and the secondary side coil may be set in the specific range.

However, in a manufacturing process of a transformer, there tends to be a variation of the position of an area in the axial direction of a coil, i.e., the beginning or ending position of the coil. Even if the length A1 and A2 of the area in the axial direction is controlled, when there is a deviance of the beginning or ending position of the winding, there is a problem in which a value of the leakage inductance between the primary side coils and the secondary side coil may vary.

At a time of a design of the boosting transformer (1), it is possible to avoid the problem of the variation in the value of the leakage inductance between the primary side coils and the secondary side coil due to variation of the beginning and ending position of the coil windings, by making the difference between the lengths A1 and A2 of the areas in the axial direction small. The smaller the difference between the lengths A1 and A2 of the areas in the axial direction, the more advantageous. For example, it is 10% or less of the length of A1 or A2, preferably 5% or less. In case of 18% or less, practically there is no problem in terms of affect of property deterioration.

On the other hand, in case of the method in which the leakage inductance between the primary side coils and the secondary side coil is increased by thickening the insulating layer (32) between the primary side coils and the secondary side coil, it is possible to correctly specify the thickness of the insulating layer (32) between the primary side coils and the secondary side coil by setting the number of turns and the thickness of the insulating layer (32) between the first and secondary coils or by using bobbin formed of resin which is described below.

Namely, according to the design concept of the boosting transformer (1) in the present invention, although the beginning and ending position of coil windings are difficult to be controlled in a manufacturing process, on condition where the difference between the lengths A1 and A2 of the areas in the axis direction is made as small as possible, that is, the variation of the value of the leakage inductance between the primary side coils and the secondary coil does not appear easily, the thickness of the insulating layer (32) between the primary side coils and the secondary side coil, which can be easily controlled in a manufacturing process, on the basis of the condition in which the leakage inductance between the primary and secondary side coils is not generated, is set up. Therefore, it is possible to realize a leakage inductance value between the primary and secondary side coils with less variation and to reduce floating electrostatic capacity between the layers of the primary and secondary side coils.

As to the beginning and ending position of winding coils, a method for providing a gap in the core (2) can be considered in order to realize less value of the leakage inductance between the primary and secondary coils, in addition to the condition in which influence of the variation on the value of the leakage inductance between the primary and a secondary side coils does not appear easily, However, if the leakage inductance between the primary and secondary side coils is increased by this method, the leakage inductance between primary side coils also increased simultaneously. Therefore, the method is not desirable.

Even when a gap is provided in the core (2), it is desirable that the gap be small so as to prevent variation in the inductance of the primary side coils (110, 120) or the secondary side coil (200), due to the variation in the permeability of the core (2).

In addition, in FIG. 2, the primary side coils (110,120) of the boosting transformer (1) which are wound by the bifilar winding method are shown. However, since in the case of the bifilar winding method, as shown in FIGS. 4A and 4B, the coils are always wound in parallel, the lengths of areas in the axial direction of both primary side coils (110, 120) become necessarily the same. Therefore, in FIG. 2, the both coils are indicated as A1 collectively. Similarly, since the lengths of both areas of two layers in the axial direction of the secondary side coil (200) are the same, they are shown as one element, indicating it as A2.

Since the leakage inductance between the primary side coils and the secondary side coil becomes large as the difference between the lengths A1 and A2 of the areas in the axial direction increases, as described above, the difference between the axial direction area lengths A1 and A2 should be made as small as possible, so that the leakage inductance between the primary side coils and the secondary side coil may not be generated. This is advantageous for efficient excimer light emission.

For example, FIG. 8 is a graph showing a waveform of each part, in case of an experimentally produced boosting transformer (1) which is the same as that of FIG. 3 except that the primary side coils (110, 120) are wound separately around right and left halves within one layer.

In FIG. 8, (a) shows a gate driving signal (313) of the switching element (311), (b) shows a gate driving signal (323) of the switching element (321), (c) shows voltage of the secondary side coil (200), i.e., lamp voltage, (Vo), and (d) shows current (Io), i.e., the lamp current of the secondary side coil (200), respectively. Moreover, at this time, the leakage inductance between the primary side coils and the secondary side coil was 0.93% thereof.

As compared with the case of FIG. 3, the steepness of the voltage waveform leading edge of the AC voltage impressed to the lamp became less, and it was actually observed that the efficiency of excimer light emission was deteriorated by about 6%.

In the case of the experimentally produced boosting transformer, since the difference between the length of an area in the axial direction where each of the primary side coils was wound and the length of an area in the axial direction where the secondary side coil was wound was about 50% of the length of the primary or secondary side coil area, in view of the efficiency thereof, it is advantageous to control the difference between the are lengths of the area in the axial direction to the above described numerical value or less.

Moreover, description of how the turn ratio of the secondary side coil to the primary side coils is set to the value or less, will be described below. As described above, there is no practical problem of the variation in the value of the leakage inductance between the primary side coils and the secondary side coil even where there is a variation of the beginning and ending position of the windings even if the difference of the area lengths in axial direction is set to the above described value or less.

However, as the turn ratio increases and the number of layers of the second side coil becomes large, the influence of the variation of the beginning and ending position of the coil winding cannot be ignored. Further, the value of the leakage inductance between the primary side coils and the secondary side coil becomes large, so that the problem of deterioration of the excimer luminous efficiency cannot be ignored. Therefore, the above-mentioned turn ratio is advantageous when it is as small as possible, for example, 20 or less, desirably 15 or less, but there is no practical problem in respect of the influence of deterioration of the property if it is 25 or less.

Therefore, in order to secure lamp voltage required for discharge starting of the excimer discharge lamp (3), and for maintaining the discharge, so as to avoid the problem, it is required to secure lamp voltage by raising the output voltage of the DC power source (330) by setting the turn ratio to the above mentioned value or less without increasing the number of turns of the secondary side coil (200).

In addition, the number of layers of the secondary side coil (200) should be six or less, for the same reason.

Moreover, the duty ratio of an electrically conductive state period to an operation cycle period of each switching element (311, 321) which is set so as to be the above-described value or less, will be described below.

The smaller the duty ratio is, the more advantageous it is in terms of suppression of excessive current flow. If the pulse-like lamp current waveform shown in (d) of FIG. 3 is made small by shutting it down at its middle, switching loss of the switching elements (311,321) may be increased, and thus it is not preferable. Therefore, it is advantageous to make the state of switching elements (311, 321) into an electrically non-conductive state at least after completion of the first current peak.

FIG. 3 shows a waveform of an inverter operated at a frequency of 50 kHz. When the frequency is made still lower, the smaller the duty ratio, the more advantageous it is to avoid the magnetic saturation problem of the core of the transformer.

However, when the duty ratio is too small, as shown in (c) of FIG. 3, after the gate driving signals (313, 323) goes into an electrically non-conductive state, the relief of a lamp voltage waveform becomes large, so as to come to intersect a zero volt, and then a LC resonance is caused by an inductance of the secondary side coil (200) and the electrostatic capacity of the excimer discharge lamp. In this state, the efficiency of the excimer light emission is deteriorated. In order to avoid this problem, it is desirable to set the duty ratio in a range of 15 to 30% in a condition where the frequency of the inverter is low.

On the other hand, if the duty ratio is made too small when making the frequency still higher, since the occupancy rate of the transition time between the electrically conductive state and the non-electrical connection of the switching elements (311, 321) increases so that an assured inverter operation may become difficult. Therefore, it is desirable to set it in the range of 15 to 30% or less under this condition. Therefore, depending on the inverter frequency, it is necessary to set the duty ratio to a suitable value, for example, 30% or less.

Figure 5:
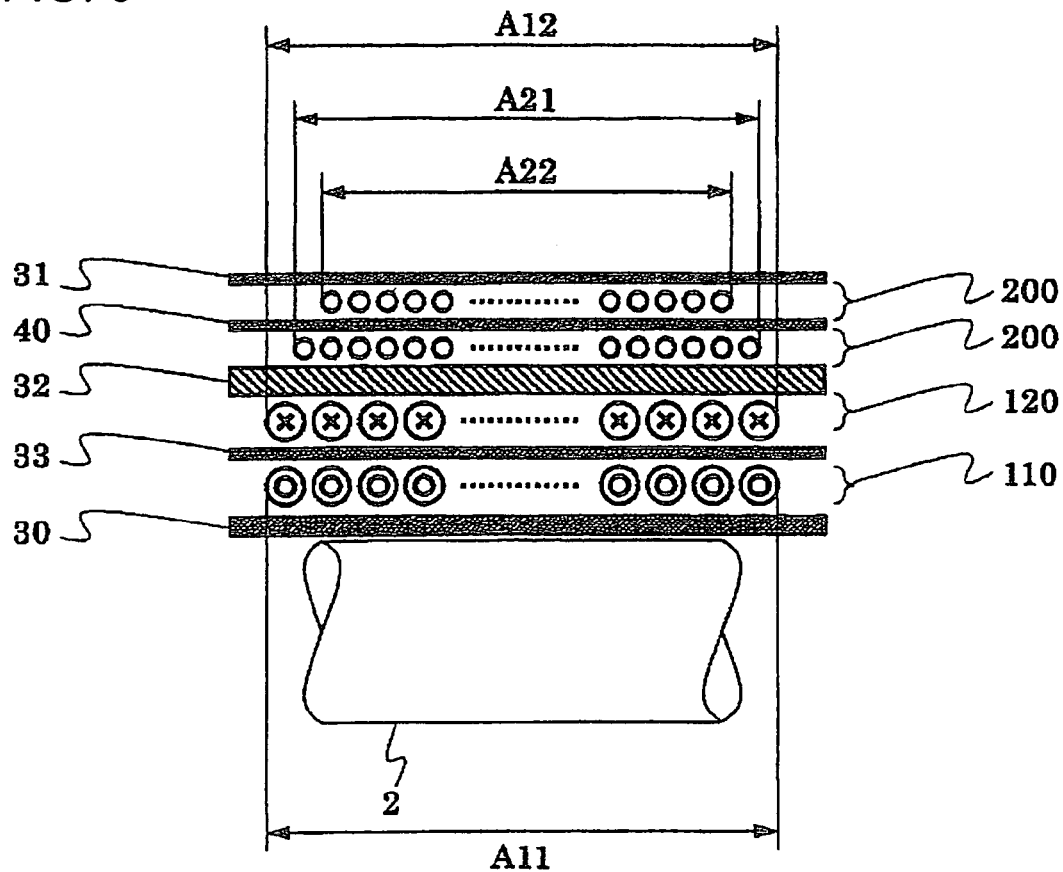
FIG. 5 is schematic cross-sectional view showing an example of part of the structure of a boosting transformer of a discharge lamp lighting apparatus.

An embodiment of the discharge lamp lighting apparatus is described, referring to FIG. 5.

As described above, in the boosting transformer (1), when the bifilar winding method is not applicable because of the problem of the voltage between adjacent coils, that is, the primary side coils (110, 120), as shown in FIG. 5, each of the primary side coils (110,120) should be configured so as to be wound in one layer, so as to form two layers in total.

Even in this case, it is necessary to make the axial direction area lengths A11 and A12 of both primary side coils (110, 120) and axial direction area lengths A21 and A22 of the respective layers of the secondary side coil (200) are set to the above mentioned numerical value range.

In addition, as a coil layer arrangement method for reducing the leakage inductance between the primary side coils and the secondary side coil, it is also possible to use a sandwich winding method in which the layer(s) of the secondary side coil (200) is sandwiched in between the respective layers of the primary side coils (110, 120).

However, as described above, from a viewpoint of suppressing the leakage inductance between the primary side coils so as to be small, it is advantageous to arrange them so that the respective layers of the primary side coils (110, 120) may be adjacent to each other whereby it is possible to make the insulating layer (33) between the respective layers of the primary side coils (110, 120) thin.

Figure 6:
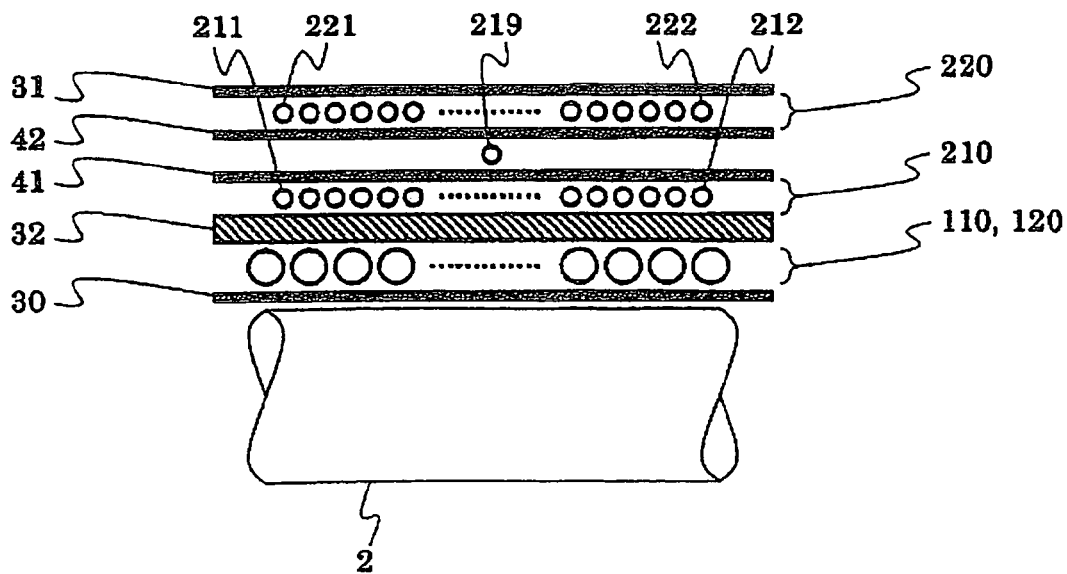
FIG. 6 is a schematic cross-sectional view showing an example of part, of the structure of a boosting transformer of a discharge lamp lighting apparatus.

Another embodiment of the discharge lamp lighting apparatus will be explained below, referring to FIG. 6.

In this embodiment, in the boosting transformer (1), the secondary side coil (200) is made up of two or more layers, and wound in a turn back winding method.

The turn back winding method will be described below. As shown in FIG. 6, in the turn back winding method, when winding of a layer (210) among the two or more layers forming the secondary side coil is started from a position (211) and ended at a position (212), winding of the next layer (220) is started back above the position (221) and ended at the position (222). In such a winding method, when returning from the position (212) to the position (221), one or more return winding can be added on the way thereto, such as the position (219).

Although the thickness of the insulating layer (41, 42) is preferably large enough to endure the voltage between layers, the leakage inductance between the primary side coils and the secondary side coil is increased by choosing the suitable thickness which is thicker than the thickness required from a viewpoint of the electric strength. At time of a design, while taking into consideration that increase in the thickness of the insulating layer (32) between the primary side coils and the secondary side coil is adjusted by providing the clearance d12 between the primary side coils (110, 120) and the secondary side coil (200) so that the leakage inductance of the primary and secondary side coils falls within the above mentioned range of the value.

As a result, as described above, heat generation of the switching elements (311, 321) can be reduced. Moreover, since loss of the floating electrostatic capacity between the layers of the secondary side coil decreases, as described above, loss of the secondary side coil (200) can be reduced.

Still another embodiment of the discharge lamp lighting apparatus will be explained, referring to FIG. 7.

In this embodiment, in a boosting transformer (1), the secondary side coil (200) is wound in a section winding method so as to be made up of two or more sections. In order to perform the section winding, a resin molded bobbin which is specially formed therefore is used.

Figure 7:
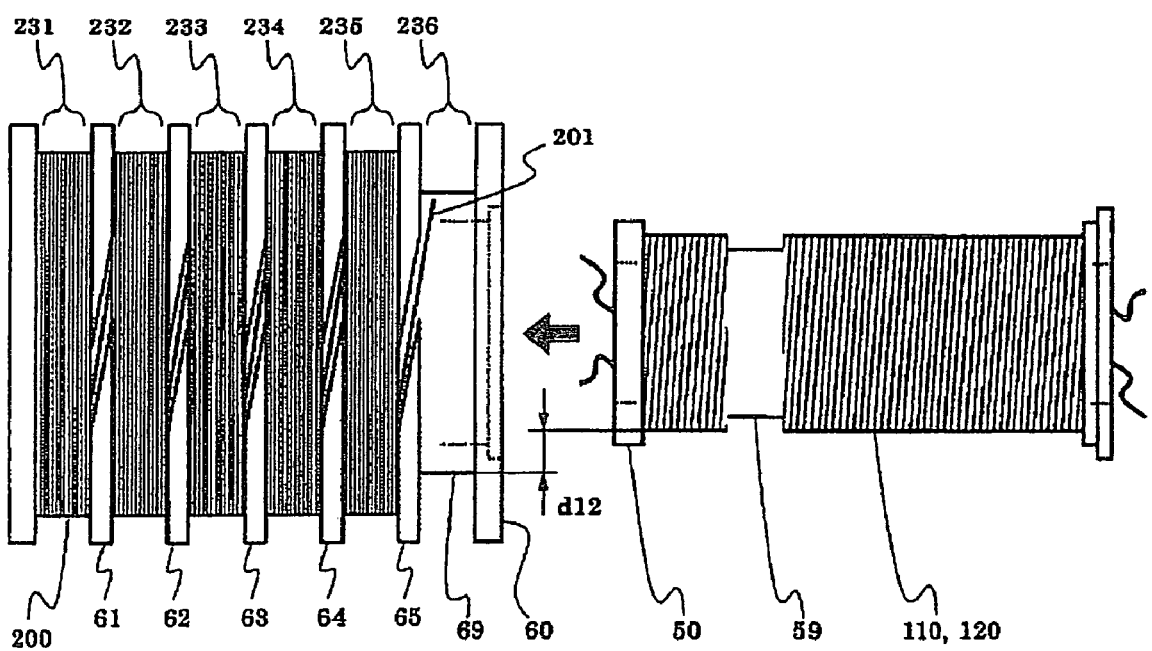
FIG. 7 is a schematic cross-sectional view showing an example of part of the structure of a boosting transformer of a discharge lamp lighting apparatus.

In the section winding method, as shown in FIG. 7, in addition to flanges provided at both ends of the bobbin, flanges (61-65) for dividing coils in a winding pitch direction are provided on the bobbin (60) for the secondary side coil so as to form two or more divided winding sections (231 to 236). Each flange (61-65) has a diagonal slit for passing a coil (201) to an adjoining coil section is provided.

On the other hand, the primary side coils (110,120) are wound in form of the bifilar winding on the bobbin (50) for the primary side coil which is separately provided in addition to the bobbin (60) for the secondary side coil. And the bobbin (50) for the primary side coils is assembled so as to be included in the bobbin (60) for the secondary side coil.

When the secondary side coil (200) is wound in the section winding method, there is a tendency that the leakage inductance between the primary side coils and the secondary side coil increases. Therefore, taking into consideration that tendency at time of a design, a diameter of a winding body (59) for the primary side coils and a diameter of the winding body (69) for the secondary side coil are adjusted so that the clearance d12 between the secondary side coil (200) and the primary side coils (110, 120) is provided, in which the value of the leaking inductance between the primary side coils and the secondary side coil falls within the above mentioned value may be provided.

As a result, it is possible to reduce heat generation of the switching elements (311, 321) as described above.

Moreover, since the floating electrostatic capacity between the sections of the secondary side coil is small, it is possible to reduce loss in the secondary side coil (200), as described above. Therefore, insulation by such a double bobbin structure, is secured more than insulation by an insulating paper or an insulating tape.

In addition, in the present discharge lamp lighting apparatus, any excimer discharge lamp which has an electric discharge plasma space filled up with the electric discharge gas containing rare gas, such as an argon, a krypton, a xenon etc. and a pair of electrodes for generating electric discharge is applicable, wherein dielectric material is inserted between at least one of the electrodes and the electric discharge plasma space.

The advantage of the present invention is that it is applicable to not only the above mentioned technical field of photochemical material reaction by processing but it is also effectively applicable to a field in which the excimer discharge lamp is turned on at a high frequency, so that ultraviolet rays are generated from electric discharge plasma space. For example, the present invention may be suitably applied to a field in which, for example, fluorescence lamp has a phosphor layer on inner or outer face of a bulb of an excimer discharge lamp, and changes the generated ultraviolet rays into visible light so as to use the light.

Moreover, the present invention may be applied to a variety of discharge lamp lighting apparatus for processing material, having one or more discharge lamp, not only to which large electric power of several kilowatts (kW) or more is impressed to each lamp, but also to which small electric power of several watts is impressed. Of course, the discharge lamp according to the present invention is not limited to that for a material processing. The present invention may be applied to any excimer discharge lamps for other purposes.

Although in FIG. 1, an example in which one excimer discharge lamp is connected to a discharge lamp lighting apparatus is shown, it is also possible to connect two or more excimer discharge lamps thereto so as to turn on the lamps.

Moreover, although an example in which one boosting transformer is connected to an inverter is shown, it is also possible to connect and to operate two or more boosting transformers.

Although an example in which the frequency of an inverter is 50 kHz is illustrated in the embodiments, since the duty ratio of an electrically conductive state period to an operation cycle of each switching element can be made small, it is applicable at a frequency in a range from several kHz to several MHz.

The preceding description has been presented only to illustrate and describe exemplary embodiments of the discharge lamp lighting apparatus according to the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A discharge lamp lighting apparatus for supplying high frequency-high voltage to an excimer discharge lamp comprising:
   a boasting transformer having a core, a secondary side coil and a pair of primary side coils;
   a DC power source; and
   switching elements,
   wherein one end of each of the primary side coils is connected to one of output modes of the DC power source,
   the other end of each of the primary side coils is connected to one end of each of the switching elements,
   the other end of each of the switching elements is connected to the other output node of the DC power source,
   the switching elements are controlled so as to alternately become an electrically conductive state, thereby serving as a push-pull inverter,
   the excimer discharge is connected to ends of the secondary side coil,
   a duty ratio of an electrically conductive period to an operational cycle of each of the switching elements is 30% or less,
   a turn ratio of the secondary side coil to each of the primary side coils is 25 or less,
   a difference between a first length of a first axial direction area where each of the primary side coils are wound, and a second length of a second axial direction area where the secondary side coil is wound, is 18% or less of the first length or the second length,
   a leakage inductance associated with magnetic coupling between the primary side coils and the secondary coil is 0.2% to 0.7% of a primary side coil inductance, and
   the primary side coils and the secondary side coil are placed apart from each other.

2. The discharge lamp lighting apparatus according to claim 1, wherein the primary side coils are wound by a bifilar winding method, so as to form one layer.

3. The discharge lamp lighting apparatus according to claim 1, where each of the primary side coils is wound to form one layer so as to form two layers in total.

4. The discharge lamp lighting apparatus according to claim 1, wherein the secondary side coil is wound by a turn back winding method so as to form tow or more layers.

5. The discharge lamp lighting apparatus according to claim 2, wherein the secondary side coil is wound by a turn back winding method so as to form tow or more layers.

6. The discharge lamp lighting apparatus according to claim 3, wherein the secondary side coil is wound by a turn back winding method so as to form tow or more layers.

7. The discharge lamp lighting apparatus according to claim 4, wherein the secondary side coil is wound by a turn back winding method so as to form tow or more layers.

8. The discharge lamp lighting apparatus according to claim 1, wherein the primary side coils are wound around a primary side coil bobbin, the secondary side coil is wound around a secondary side coil bobbin by a section winding method, and one of the primary side coil bobbin and the secondary side coil bobbin is placed inside the other.

9. The discharge lamp lighting apparatus according to claim 2, wherein the primary side coils are wound around a primary side coil bobbin, the secondary side coil is wound around a secondary side coil bobbin by a section winding method, and one of the primary side coil bobbin and the secondary side coil bobbin is placed inside the other.

10. The discharge lamp lighting apparatus according to claim 3, wherein the primary side coils are wound around a primary side coil bobbin, the secondary side coil is wound around a secondary side coil bobbin by a section winding method, and one of the primary side coil bobbin and the secondary side coil bobbin is placed inside the other.

11. The discharge lamp lighting apparatus according to claim 4, wherein the primary side coils are wound around a primary side coil bobbin, the secondary side coil is wound around a secondary side coil bobbin by a section winding method, and one of the primary side coil bobbin and the secondary side coil bobbin is placed inside the other.

12. The discharge lamp lighting apparatus according to claim 5, wherein the primary side coils are wound around a primary side coil bobbin, the secondary side coil is wound around a secondary side coil bobbin by a section winding method, and one of the primary side coil bobbin and the secondary side coil bobbin is placed inside the other.

13. The discharge lamp lighting apparatus according to claim 6, wherein the primary side coils are wound around a primary side coil bobbin, the secondary side coil is wound around a secondary side coil bobbin by a section winding method, and one of the primary side coil bobbin and the secondary side coil bobbin is placed inside the other.

14. The discharge lamp lighting apparatus according to claim 7, wherein the primary side coils are wound around a primary side coil bobbin, the secondary side coil is wound around a secondary side coil bobbin by a section winding method, and one of the primary side coil bobbin and the secondary side coil bobbin is placed inside the other.

* * * * *